(12) United States Patent
Karaoguz et al.

(10) Patent No.: US 8,095,162 B2
(45) Date of Patent: *Jan. 10, 2012

(54) CONTROL DEVICE FOR ALLOCATING RESOURCES TO COMMUNICATION DEVICES THAT USE DIFFERING PROTOCOLS AND METHODS FOR USE THEREWITH

(75) Inventors: Jeyhan Karaoguz, Irvine, CA (US); Jason A. Trachewsky, Menlo Park, CA (US); Vinko Erceg, Cardiff by the Sea, CA (US); Matthew J. Fischer, Mountain View, CA (US); Christopher J. Hansen, Sunnyvale, CA (US); Saishankar Nandagopalan, San Diego, CA (US); Murrat Mese, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 12/436,879

(22) Filed: May 7, 2009

(65) Prior Publication Data

US 2010/0285823 A1 Nov. 11, 2010

(51) Int. Cl.
*H04B 7/00* (2006.01)

(52) U.S. Cl. ......... 455/509; 375/354; 370/401; 370/389
(58) Field of Classification Search .............. 455/509, 455/62, 524, 327; 375/354; 370/401, 252, 370/389, 395.5

See application file for complete search history.

(56) References Cited

U.S. PATENT DOCUMENTS

| 5,978,666 | A  | * | 11/1999 | Faulkner et al. | 455/327 |
| 6,006,069 | A  | * | 12/1999 | Langston | 455/62 |
| 6,201,454 | B1 | * | 3/2001 | Kinayman et al. | 333/33 |
| 7,852,860 | B2 | * | 12/2010 | Aizu et al. | 370/401 |
| 8,032,167 | B2 | * | 10/2011 | Karaoguz et al. | 455/509 |
| 2006/0291483 | A1 | * | 12/2006 | Sela | 370/401 |

* cited by examiner

*Primary Examiner* — Lam T Mai

(74) *Attorney, Agent, or Firm* — Garlick Harrison & Markison; Bruce E. Stuckman

(57) ABSTRACT

A control device includes at least one communication interface for communicating first control data with a first plurality of communication devices that utilize the millimeter wave frequency band in accordance with a first protocol and further for communicating second control data with a second plurality of communication devices that utilize the millimeter wave frequency band in accordance with a second protocol. A resource controller allocates resources of the millimeter wave frequency band to the first plurality of communication devices and the second plurality of communication devices based on the first control data and the second control data.

20 Claims, 10 Drawing Sheets

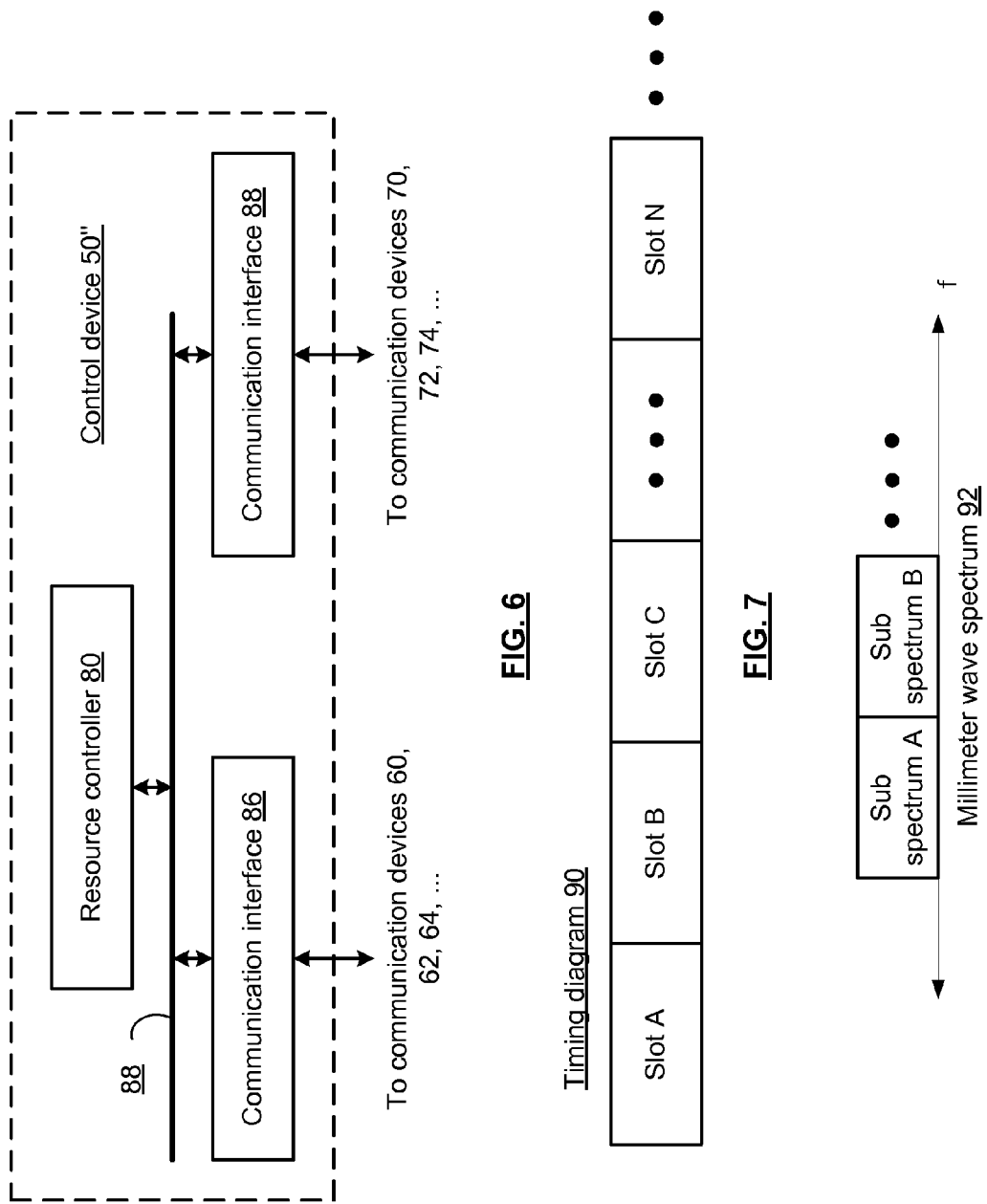

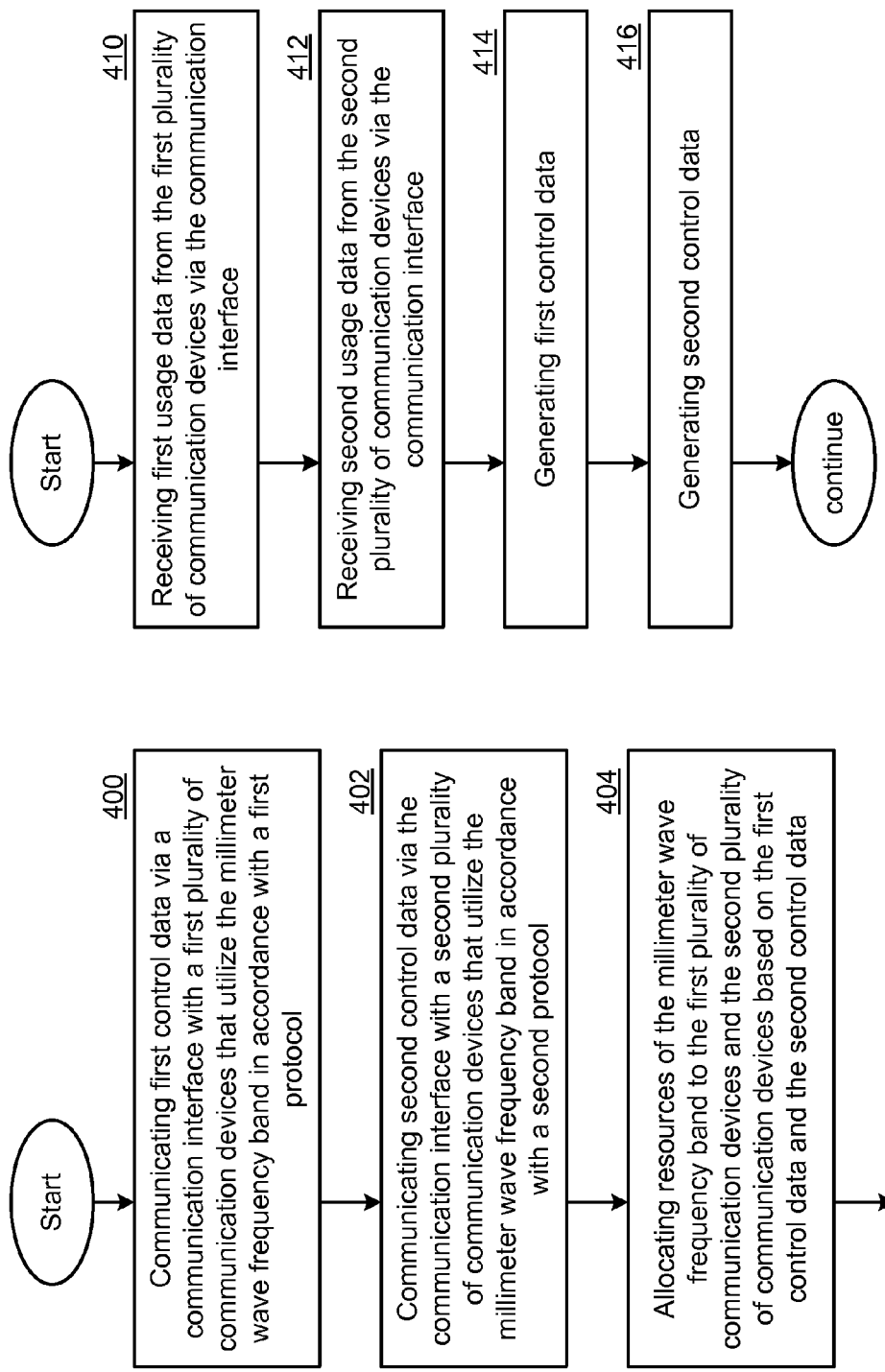

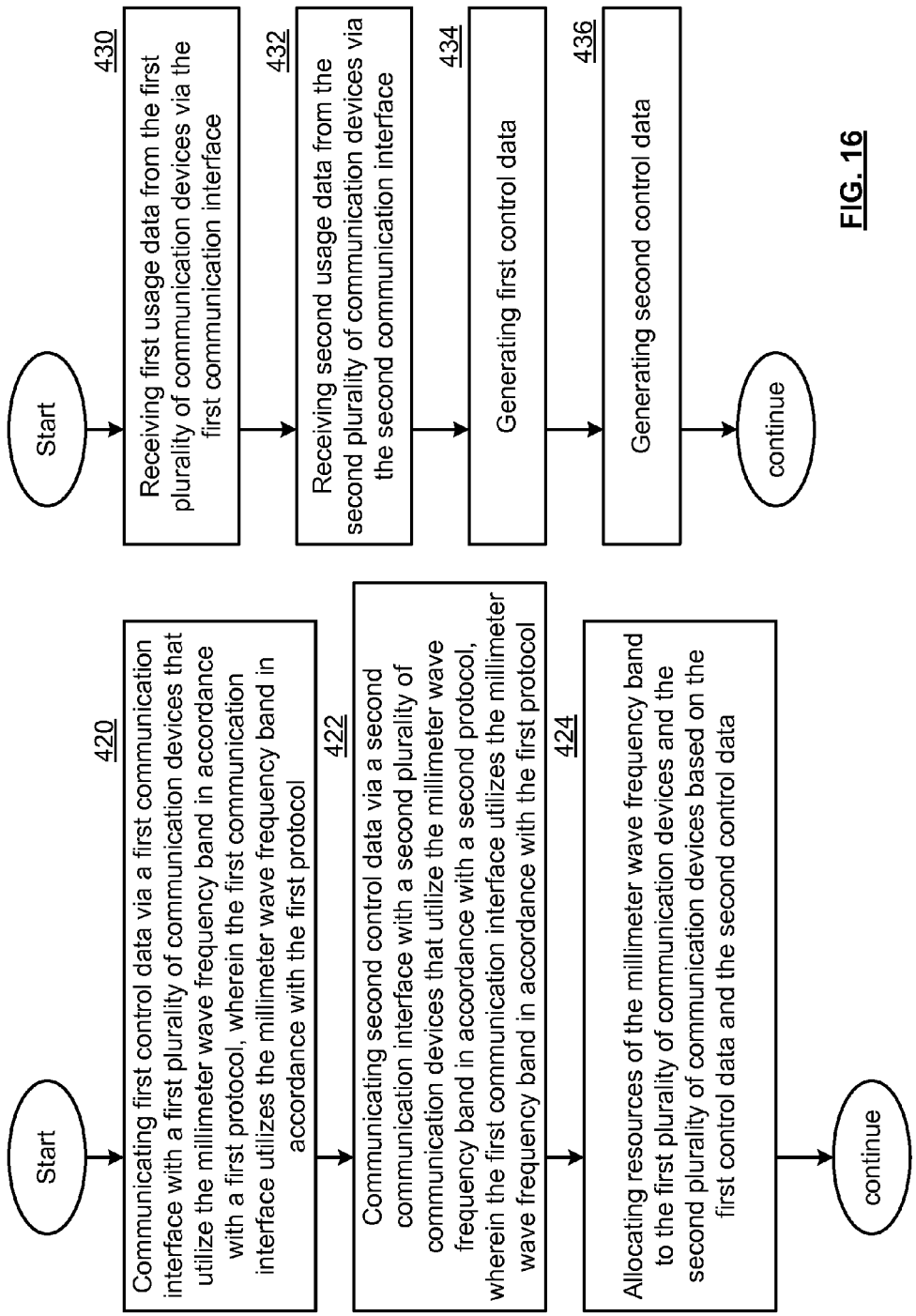

CONTROL DEVICE FOR ALLOCATING RESOURCES TO COMMUNICATION DEVICES THAT USE DIFFERING PROTOCOLS AND METHODS FOR USE THEREWITH

CROSS REFERENCE TO RELATED PATENTS

The present application is related to the following U.S. patent application:

MULTIMODE CONTROL DEVICE FOR ALLOCATING RESOURCES TO COMMUNICATION DEVICES THAT USE DIFFERING PROTOCOLS AND METHODS FOR USE THEREWITH having Ser. No. 12/436,882, filed on on May 7, 2009;

the contents of which are incorporated herein by reference thereto.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication and more particularly to transceivers used to support wireless communications in unlicensed spectra.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

Different radio networks sometimes share the same spectrum. For example, Bluetooth transceivers and 802.11g transceivers may both be present in a single area using the 2.4 GHz band. In the V-band, devices using Wireless HD (WiHD) and devices using the Next Generation Microwave System (NGMS) may be present in a single area. Transmissions by one device can cause interference with other devices that use the same frequency band with the same area.

Other disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 6 is a schematic block diagram of an embodiment of a control device 50" in accordance with the present invention;

FIG. 7 is a graphical representation of timing diagram 90 in accordance an embodiment of the present invention;

FIG. 8 is a graphical representation of millimeter wave spectrum 92 in accordance an embodiment of the present invention;

FIG. 13 is a flowchart representation of an embodiment of a method in accordance with the present invention;

FIG. 14 is a flowchart representation of an embodiment of a method in accordance with the present invention;

FIG. 15 is a flowchart representation of an embodiment of a method in accordance with the present invention; and FIG. 16 is a flowchart representation of an embodiment of a method in accordance with the present invention.

DETAILED DESCRIPTION OF THE INVENTION

Figure 1:
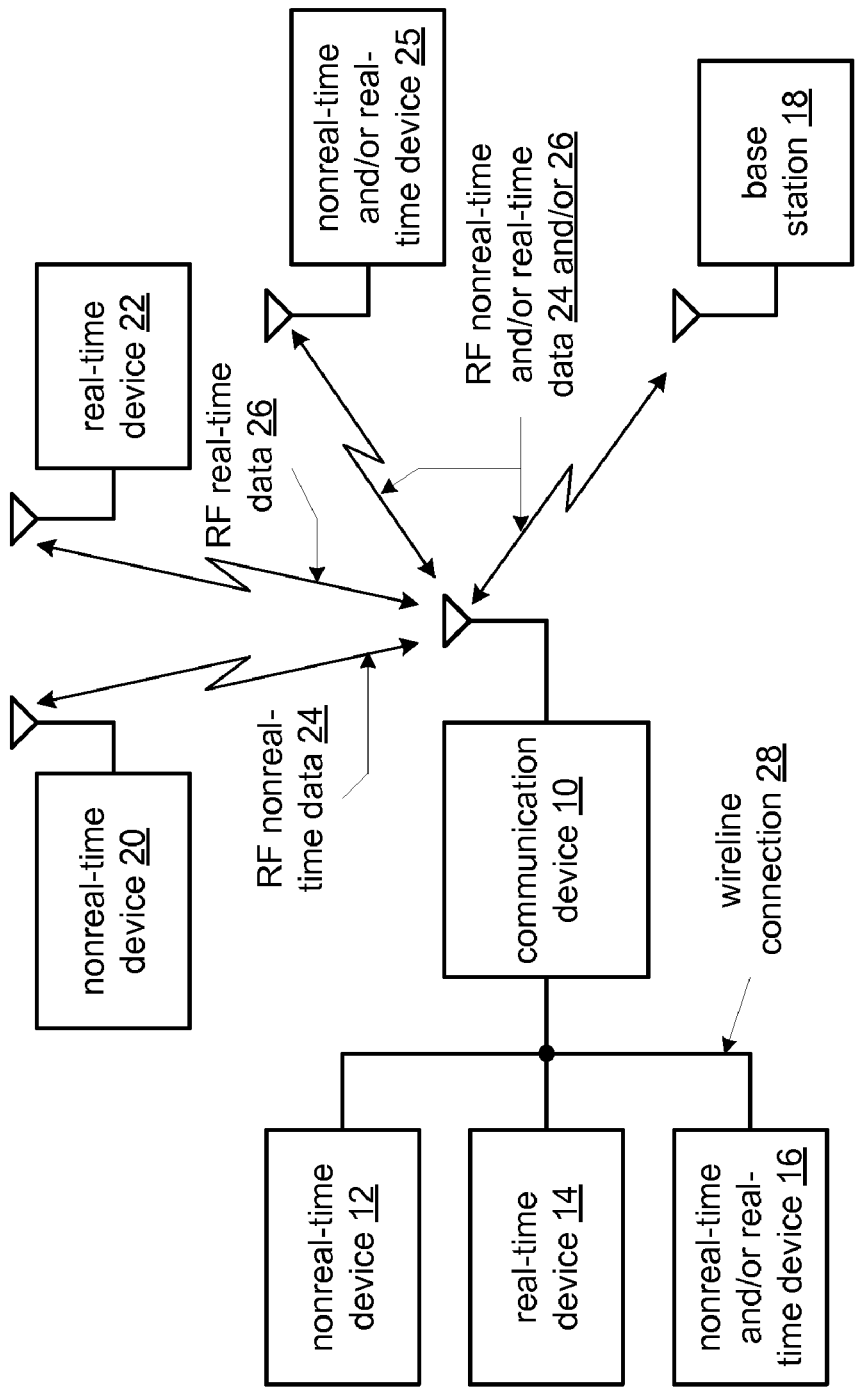
FIG. 1 is a schematic block diagram of an embodiment of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a wireless transceiver that includes one or more features or functions of the present invention. Such wireless transceivers shall be described in greater detail in association with FIGS. 3-16 that follow.

Figure 2:
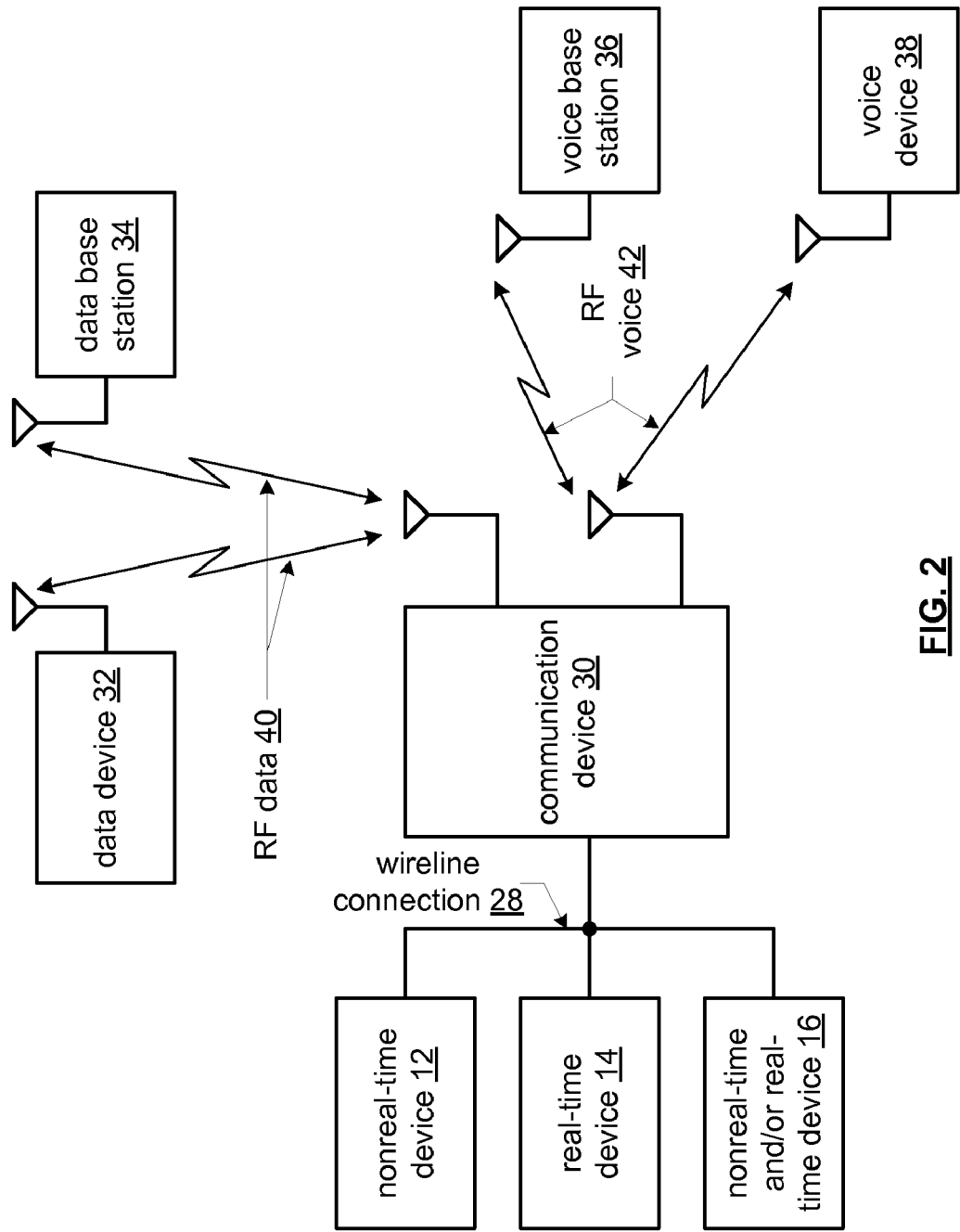
FIG. 2 is a schematic block diagram of another embodiment of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
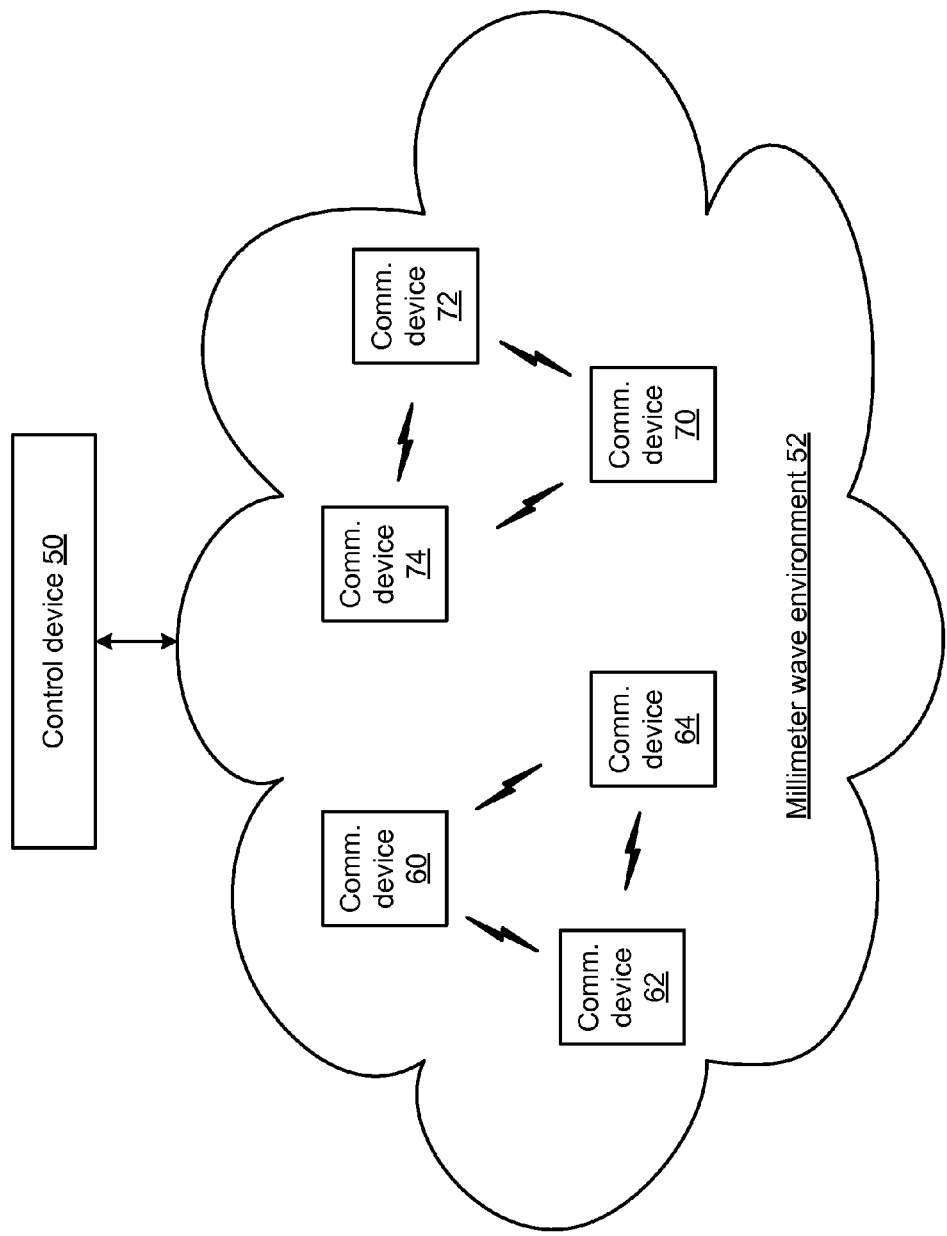
FIG. 3 is a schematic block diagram of an embodiment of a control device 50 that allocates resources in a millimeter wave environment 52 in accordance with the present invention.

FIG. 3 is a schematic block diagram of an embodiment of a control device 50 that allocates resources in a millimeter wave environment 52 in accordance with the present invention. In particular, the millimeter wave environment 52 can include the V-band of 55-64 GHz or other millimeter wave frequency band or unlicensed spectrum that is shared by two groups of communication devices operating via different protocols. For example, communication devices 60, 62, 64, . . . are examples of communication devices 10 or 30 that communicate with one another in accordance with a WiHD protocol. Further, communication devices 70, 72, and 74 are further examples of communication devices 10 or 30 that communicate with one another in accordance with a NGMS protocol. Without further coordination, transmissions by devices in the group 60, 62, 64, . . . can cause interference with devices in the group 70, 72, 74, . . . and vice versa. Control device 50 harmonizes the usage of the millimeter wave environment 52 by allocating resources to the communication devices 60, 62, 64, 70, 72, and 74. In particular, control device 50 operates to control access to the millimeter wave environment 52 to reduce interference between communication devices in these two groups.

Further details regarding the operation of control device 50 and communication devices 60, 62, 64, 70, 72, and 74, including several optional functions and features, will be presented in conjunction with FIGS. 4-16 that follow.

Figure 4:
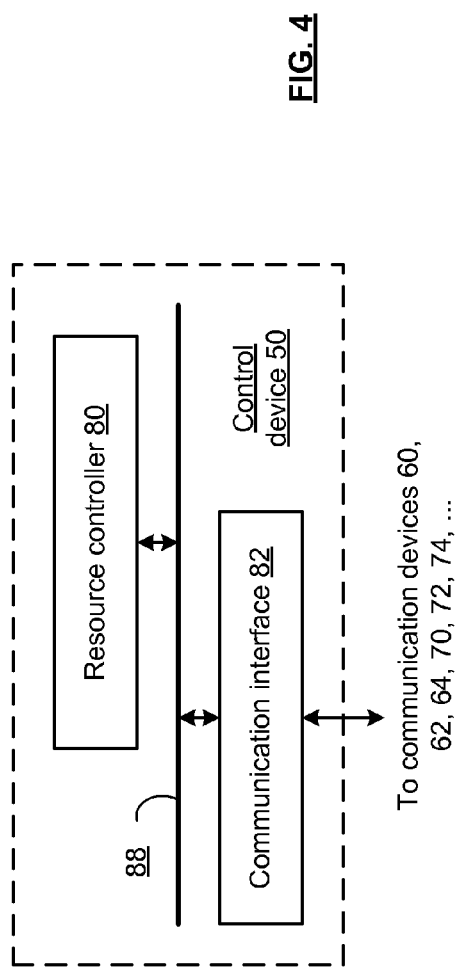
FIG. 4 is a schematic block diagram of an embodiment of a control device 50 in accordance with the present invention.

FIG. 4 is a schematic block diagram of an embodiment of a control device 50 in accordance with the present invention. In particular, control device 50 includes a resource controller 80 for allocating resources of the millimeter wave environment, such as millimeter wave environment 52, to the communication devices 60, 62, 64, 70, 72 and 74. Control device 50 further includes communication interface 82, coupled to the resource controller 80 via bus 88, for communicating with communication devices 60, 62, 64, 70, 72 and 74. Communication interface 82 can operate in accordance with a wireline connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. In the alternative, communication interface 82 can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. In either case, control device 50 can communicate bidirectionally with the communication devices 60, 62, 64, 70, 72 and 74, either directly or via one or more communication networks.

In operation, communication interface 82 receives usage data from the communication devices 60, 62 and 64 regarding their communications with one another. The usage data can include quality of service requirements, throughput requirements, data rates, and device pairing data. Communication interface 82 also receives usage data from the communication devices 70, 72 and 74 regarding their communications with one another. The usage data from both groups of communication devices is sent to resource controller 80 and used to generate first control data that is sent back to communication devices 60, 62, 64 and second control data that is sent back to communication devices 70, 72, and 74 that allocates the resources of the millimeter wave environment between these two groups of communication devices.

In particular, resource controller 80 can allocate the resources of the millimeter wave environment 52 by allocating a first subset of the resources of the millimeter wave environment 52 to the communication devices 60, 62 and 64 and allocating a second subset of the resources of the millimeter wave environment 52 to the communication devices 70, 72, 74, such that the first subset of the resources of the millimeter wave environment 52 is mutually exclusive of the second subset of the resources of the millimeter wave environment 52. For instance, resource controller can divide the total frequency spectrum of the millimeter wave environment 52 into a first sub-spectrum used by communication devices 60, 62 and 64 and a second sub-spectrum used by communication devices 70, 72 and 74, based on the usage data provided by each group of communication devices. In another example, time slots can be allocated between communication devices 60, 62 and 64 and communication devices 70, 72 and 74 to share the millimeter wave environment 52. Similarly, other multiple access resources such as space division channels, code division channels, token allocations or other resources can be allocated between the two groups of communication devices. Control data reflecting this allocation of resources can be generated and sent to the communications devices in each group. In this fashion, interference between groups of devices can be reduced or eliminated altogether.

Resource controller 80 can be implemented using a shared processing device, individual processing devices, or a plurality of processing devices and may further include memory. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the resource controller 80 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, the resource controller 80 operates via a look-up table or algorithm that generates the control data based on the usage data received from the communication devices 60, 62, 64, 70, 72, and 74. As discussed in the example above, the resources of the millimeter wave environment 52 can be divided into mutually exclusive subsets and allocated between the groups of communication devices in proportion to the usage requirements of each group. For instance, in an example where communication device 60 is engaged in real-time communication such as streaming video, with communication devices 62 and 64 and communication devices 70, 72 and 74 are engaged in non-real-time communication such as text messaging, resource controller 80 can generate control data for each group of communication devices to allocate greater resources to the communications devices 60, 62 and 64, based on their greater need.

In a further embodiment of the present invention, one or both groups of communication devices (60, 62, 64) or (70, 72, 74) require the resource controller 80 to download a software shim, patch or other executable code to allow the resources of the millimeter wave environment 52 to be allocated under the control of resource controller 80. In either of these cases, the resource controller 80 can download device software, via the control data, for execution one or more communication devices in either group (60, 62, 64) or (70, 72, 74). Resource controller 80 can store a separate software shim, patch or other executable code, based on the particular protocols that share the millimeter wave environment 52. For example, resource controller 80 can store a separate software shim, patch or other executable code, for use by communication devices that operate via WiHD and NGMS to be downloaded and executed by corresponding devices to implement the allocation of resources as discussed herein.

Figure 5:
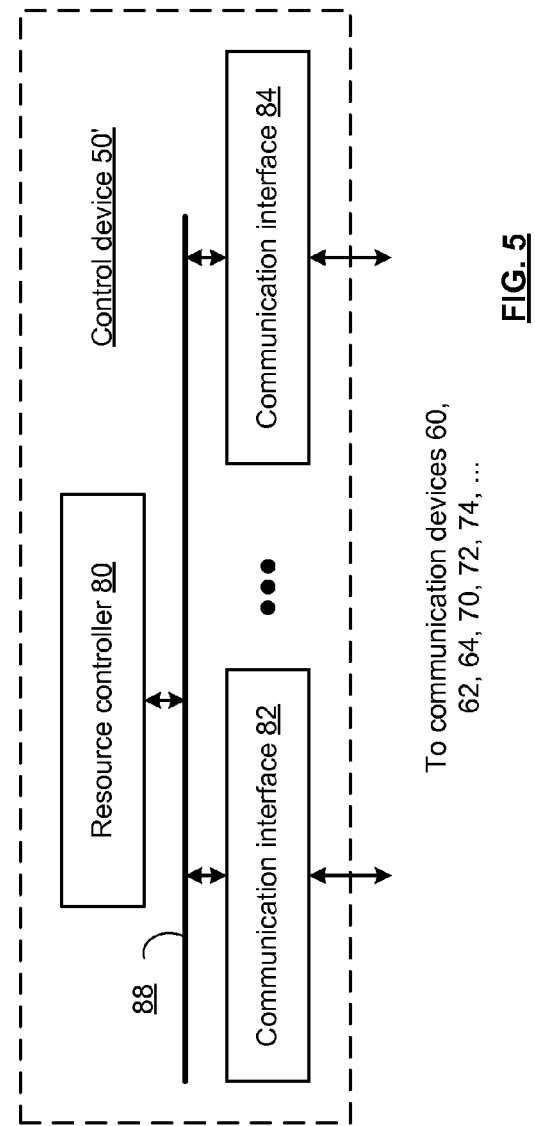
FIG. 5 is a schematic block diagram of an embodiment of a control device 50' in accordance with the present invention.

FIG. 5 is a schematic block diagram of an embodiment of a control device 50' in accordance with the present invention. In particular, control device 50' includes each of the functions and features described in conjunction with control device 50. However, control device 50' includes two different communication interfaces 82 and 84 for communicating with communication devices 60, 62, 64, 70, 72, 74. For example, control device 50' can communicate with some of the communication devices 60, 62, 64, 70, 72, 74 via communication interface 82 and others of the communication devices 60, 62, 64, 70, 72 via communication interface 84. Communication interfaces 82 and 84 can both be wireless interfaces, both be wired interfaces or include one wired interface and one wireless interface. In addition, while two communications interfaces 82 and 84 are specifically shown, a greater number of communication interfaces can likewise be employed.

FIG. 6 is a schematic block diagram of an embodiment of a control device 50" in accordance with the present invention. In particular, control device 50" includes each of the functions and features described in conjunction with control device 50. In contrast to control device 50 that communicates with communication devices 60, 62, 64, 70, 72, 74 out of band of the millimeter wave environment 52, control device 50" is a dual mode device that itself communicates in the millimeter wave environment 52. In particular, control device 50" includes a first communication interface 86 to communicate with communication devices 60, 62, 64 via a first protocol such as WiHD and a second communication interface 88 to communicate with communication devices 70, 72, 74 via a second protocol, such as NGMS. In this fashion, a dual mode device that operates via two protocols in the millimeter wave environment 52 can include control device 50" and be used to allocate resources of the millimeter wave environment 52 between two groups of single mode devices that each operate in conjunction with only one of the two protocols.

It should be noted that while the foregoing description of control devices 50, 50' and 50" has focused on the control of two groups of devices within a millimeter wave environment 52, the principles of the present invention can likewise apply to the allocation of resources by control devices 50, 50' and 50" to three or more groups of devices operating in an unlicensed spectrum such as millimeter wave environment 52.

FIG. 7 is a graphical representation of timing diagram 90 in accordance an embodiment of the present invention. In particular, timing diagram 90 includes time slots A, B, C, . . . N. As discussed in conjunction with FIG. 4-6, control device 50, 50' or 50" can operate to allocate different time slots to different groups of communications devices operating via different protocols in the same spectrum. In particular, control data generated by control device 50, 50' or 50" can establish a common time base containing the time slots A, B, C, . . . N and can allocate subsets of the time slots between the groups of communication devices to avoid interference.

FIG. 8 is a graphical representation of millimeter wave spectrum 92 in accordance an embodiment of the present invention. In particular, millimeter wave spectrum 92 includes sub spectra A, B, etc. As discussed in conjunction with FIG. 4-6, control device 50, 50' or 50" can operate to allocate different sub spectra within the millimeter wave spectrum 92 to different groups of communications devices operating via different protocols. In particular, control data generated by control device 50, 50' or 50" can establish the range of each sub spectra A, B, etc. can allocate one or more sub spectra between the groups of communication devices to avoid interference.

Figure 9:
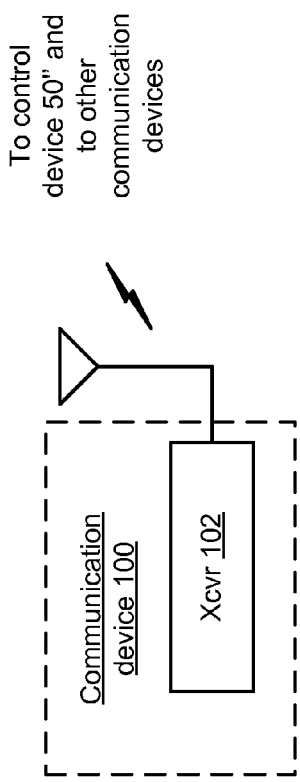
FIG. 9 is a schematic block diagram of a communication device 100 in accordance an embodiment of the present invention.

FIG. 9 is a schematic block diagram of a communication device 100 in accordance an embodiment of the present invention. Communication device 100 can be used to implement any of the communication devices (60, 62, 64) or (70, 72, 74). In particular, communication device 100 is a single mode device that includes a wireless transceiver 102, that operates in a complementary fashion to communication interface 86 or 88 to communicate with control device 50" and also with other communication devices in its group within the millimeter wave environment 52. In this embodiment, the control data received from control device 50" and the usage data transmitted to the control device 50" are sent via the same physical millimeter wave environment 52 used by the communication device 100 to communicate with other communication devices in its group.

Figure 10:
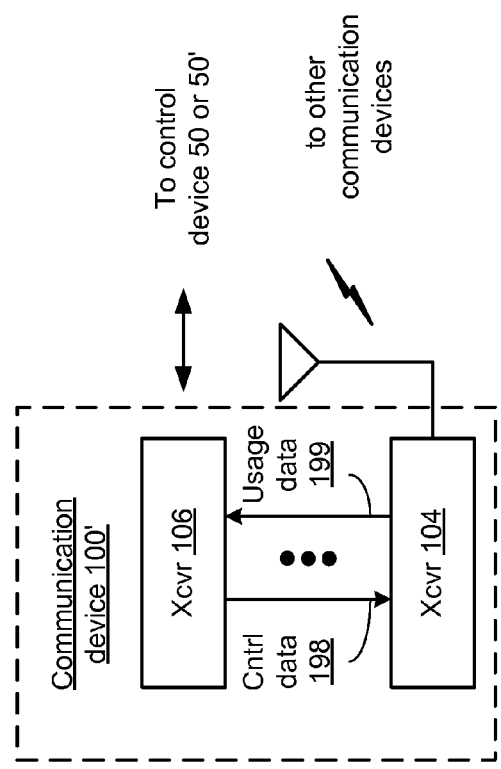
FIG. 10 is a schematic block diagram of a communication device 100' in accordance an embodiment of the present invention.

FIG. 10 is a schematic block diagram of a communication device 100' in accordance an embodiment of the present invention. Communication device 100' can be also be used to implement any of the communication devices (60, 62, 64) or (70, 72, 74). In particular, communication device 100' is a single mode device that includes a wireless or wired transceiver 106, that operates in a complementary fashion to communication interfaces 82 or 84 to communicate with control device 50 or 50'. Wireless transceiver 104 communicates with other communication devices in its group within the millimeter wave environment 52. In this embodiment, the control data 198 received from control device 50 or 50' and the usage data 199 transmitted to the control device 50 or 50' are sent via the transceiver 106 outside of the millimeter wave environment 52 used by the communication device 100' to communicate with other communication devices in its group.

Figure 11:
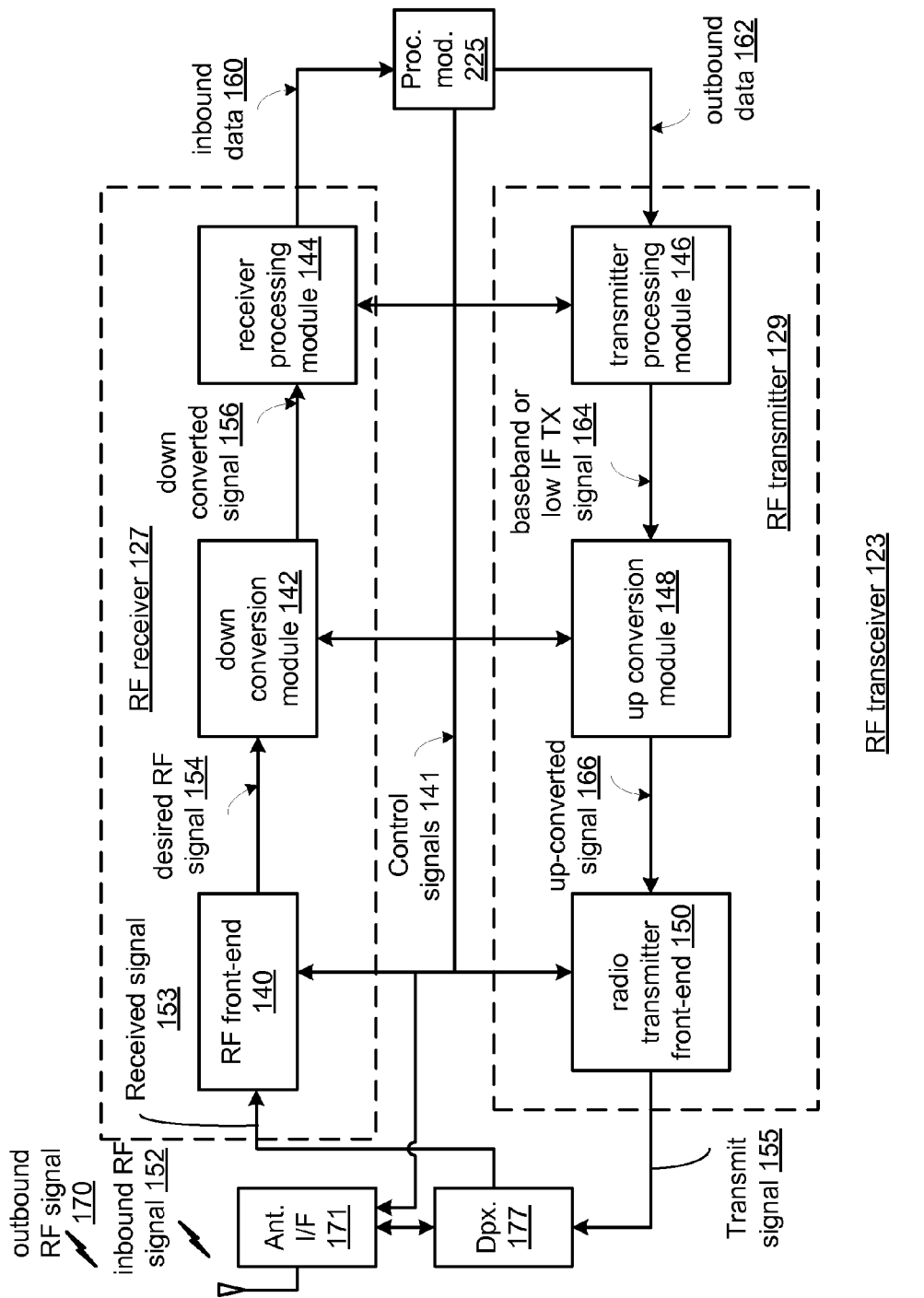
FIG. 11 is a further schematic block diagram of an RF transceiver 123 in accordance an embodiment of the present invention.

FIG. 11 is a further schematic block diagram of an RF transceiver 123 in accordance an embodiment of the present invention. The RF transceiver 123, such as transceiver 102, includes an RF transmitter 129, and an RF receiver 127. The RF receiver 127 includes a RF front end 140, a down conversion module 142 and a receiver baseband processing module 144 that operate under the control of control signals 141. The RF transmitter 129 includes a transmitter baseband processing module 146, an up conversion module 148, and a radio transmitter front-end 150 that also operate under control of control signals 141.

As shown, the receiver and transmitter are each coupled to an antenna through an antenna interface 171 and a diplexer (duplexer) 177, such as antenna interface 72 or 74, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration.

In operation, the transmitter receives outbound data 162 from other portions of its a host device, such as a communication application executed by processing module 225 or other source via the transmitter processing module 146. The transmitter processing module 146 processes the outbound data 162 in accordance with a particular wireless communication standard (e.g., WiHD, NGMS) to produce baseband or low intermediate frequency (IF) transmit (TX) signals 164 that contain outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., WiHD, NGMS) to produce inbound data 160. The processing performed by the receiver processing module 144 includes, but is not limited to, digital intermediate frequency to baseband conversion, demodulation, demapping, depuncturing, decoding, and/or descrambling.

In an embodiment of the present invention, processing module 225 executes a communication application that controls the communication with other communication devices in the group. As discussed in conjunction with FIG. 9 the RF transceiver 123, the control data received from control device 50" and the usage data transmitted to the control device 50" are sent via the same physical millimeter wave environment 52 used by the RF transceiver 123 to communicate with other communication devices in its group. The communication application generates outbound data 162 that includes the usage data sent to control device 50" and in the inbound data 160 includes the control data received from control device 50".

In response to the control data received from control device 50", processing module 225 generates one or more control signals 141 to configure or adapt the RF transceiver 123 based on the resources of millimeter wave environment 52 that have been allocated to this device or group of devices. In operation, processing module 225 generates control signals 141 to modify the transmit and/or receiver parameters of the RF transceiver 125 such as frequency channels or sub spectra, time slots, spatial channels or other multiple access parameters used by RF front-end 140, radio transmitter front-end 150, down conversion module 142 and up conversion module 148, as well as antenna configurations used by antenna interface 171 to set the beam pattern, gain, polarization or other antenna configuration of the antenna.

The control signals 141 can be analog signals, digital signals, discrete-time signals of other signals that control the modules of RF transceiver 123 to adapt to communication based on the control data received from control device 50". As discussed in conjunction with FIG. 4, this control data can include a software shim, patch or other executable code downloaded from control device 50" to allow the resources of the millimeter wave environment 52 to be allocated under the control of resource controller 80. For instance, RF transceiver 123 can operate as a cognitive radio transceiver to execute the executable code downloaded from control device 50" to configure the parameters of RF transceiver 123. In response, the processing module 225 executes the software shim, patch or other executable code along with other control data from control device 50" to implement the allocation of resources in conjunction with the communication with other devices in the group.

Figure 12:
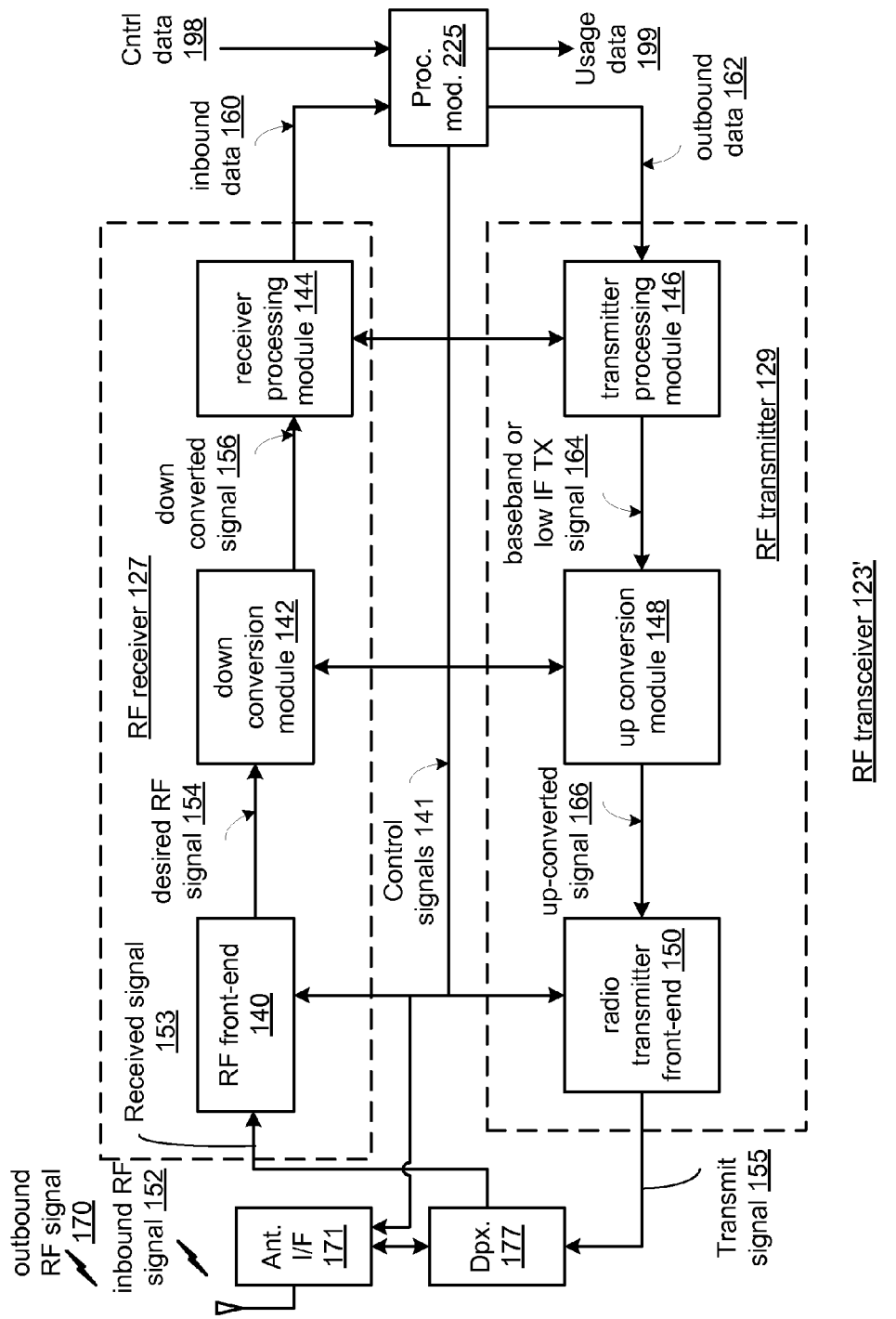
FIG. 12 is a further schematic block diagram of an RF transceiver 123' in accordance an embodiment of the present invention.

FIG. 12 is a further schematic block diagram of an RF transceiver 123' in accordance an embodiment of the present invention. In particular, RF transceiver 123' includes many similar elements described in conjunction with FIG. 11 that are referred to by common reference numerals. In this embodiment however, RF transceiver 123' operates as transceiver 104 to send usage data 199 and receive control data 198 from a control device 50 or 50' via an out of band transceiver 106. In this embodiment, inbound data 160 and outbound data 162 are dedicated to communication with other devices in the group.

FIG. 13 is a flowchart representation of an embodiment of a method in accordance with the present invention. In particular, a method is presented for use in conjunction with one or more features and functions described in conjunction with FIGS. 1-12. In step 400, first control data is communicated via a communication interface with a first plurality of communication devices that utilize the millimeter wave frequency band in accordance with a first protocol. In step 402, second control data is communicated via the communication interface with a second plurality of communication devices that utilize the millimeter wave frequency band in accordance with a second protocol. In step 404, resources of the millimeter wave frequency band are allocated to the first plurality of communication devices and the second plurality of communication devices based on the first control data and the second control data.

In an embodiment of the present invention, the first protocol includes a wireless high definition communication standard; and the second protocol includes a next generation millimeter wave communication standard. The millimeter wave frequency band can include a V-band. Step 404 can include allocating a first subset of the resources of the millimeter wave frequency band to the first plurality of communication devices; and allocating a second subset of the resources of the millimeter wave frequency band to the second plurality of communication devices, wherein the first subset of the resources of the millimeter wave frequency band is mutually exclusive of the second subset of the resources of the millimeter wave frequency band. The resources of the millimeter wave frequency band can include at least one of: a plurality of frequency channels; a plurality of time slots; and a plurality of spatial channels.

In an embodiment of the present invention, the control data includes device software for execution to at least one of the first plurality of communication devices.

FIG. 14 is a flowchart representation of an embodiment of a method in accordance with the present invention. In particular, a method is presented for use in conjunction with one or more features and functions described in conjunction with FIGS. 1-13. In step 410, first usage data are received from the first plurality of communication devices via the communication interface. In step 412, second usage data are received from the second plurality of communication devices via the communication interface. In step 414, the first control data are generated. In step 416, the second control data are generated.

In an embodiment of the present invention, resources of the millimeter wave frequency band are allocated to the first plurality of communication devices and the second plurality of communication devices based on the first usage data and the second usage data. The first usage data can include at least one of a quality of service requirement, a throughput requirement, and device pairing data.

FIG. 15 is a flowchart representation of an embodiment of a method in accordance with the present invention. In particular, a method is presented for use in conjunction with one or more features and functions described in conjunction with FIGS. 1-14. In step 420, first control data are communicated via a first communication interface with a first plurality of communication devices that utilize the millimeter wave frequency band in accordance with a first protocol, wherein the first communication interface utilizes the millimeter wave frequency band in accordance with the first protocol. In step 422, second control data are communicated via a second the communication interface with a second plurality of communication devices that utilize the millimeter wave frequency band in accordance with a second protocol, wherein the second communication interface utilizes the millimeter wave frequency band in accordance with the second protocol. In step 424, resources of the millimeter wave frequency band are allocated to the first plurality of communication devices and the second plurality of communication devices based on the first control data and the second control data.

In an embodiment of the present invention, the first protocol includes a wireless high definition communication standard; and the second protocol includes a next generation millimeter wave communication standard. The millimeter wave frequency band can include a V-band. Step 424 can include allocating a first subset of the resources of the millimeter wave frequency band to the first plurality of communication devices; and allocating a second subset of the resources of the millimeter wave frequency band to the second plurality of communication devices, wherein the first subset of the resources of the millimeter wave frequency band is mutually exclusive of the second subset of the resources of the millimeter wave frequency band. The resources of the millimeter wave frequency band can include at least one of: a plurality of frequency channels; a plurality of time slots; and a plurality of spatial channels.

In an embodiment of the present invention, the control data includes device software for execution to at least one of the first plurality of communication devices.

FIG. 16 is a flowchart representation of an embodiment of a method in accordance with the present invention. In particular, a method is presented for use in conjunction with one or more features and functions described in conjunction with FIGS. 1-15. In step 430, first usage data are received from the first plurality of communication devices via the first communication interface. In step 432, second usage data are received from the second plurality of communication devices via the second communication interface. In step 434, the first control data are generated. In step 436, the second control data are generated.

In an embodiment of the present invention, resources of the millimeter wave frequency band are allocated to the first plurality of communication devices and the second plurality of communication devices based on the first usage data and the second usage data. The first usage data can include at least one of a quality of service requirement, a throughput requirement, and device pairing data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has been described in conjunction with various illustrative embodiments that include many optional functions and features. It will be apparent to those skilled in the art that the disclosed invention may be modified in numerous ways, the functions and features of these embodiments can be combined in other embodiments not expressly shown, and may assume many embodiments other than the preferred forms specifically set out and described above. Accordingly, it is intended by the appended claims to cover all modifications of the invention which fall within the true spirit and scope of the invention.

What is claimed is:

1. A control device for controlling access to a millimeter wave frequency band, the device comprising:
   at least one communication interface for communicating first control data with a first plurality of communication devices that utilize the millimeter wave frequency band in accordance with a first protocol and further for communicating second control data with a second plurality of communication devices that utilize the millimeter wave frequency band in accordance with a second protocol; and
   a resource controller, coupled to the at least one communication interface, for allocating resources of the millimeter wave frequency band to the first plurality of communication devices and the second plurality of communication devices based on the first control data and the second control data.

2. The control device of claim 1 wherein the first protocol includes a wireless high definition communication standard; and the second protocol includes a next generation millimeter wave communication standard.

3. The control device of claim 1 wherein the millimeter wave frequency band includes a V-band.

4. The control device of claim 1 wherein the resource controller allocates the resources of the millimeter wave frequency band by:
   allocating a first subset of the resources of the millimeter wave frequency band to the first plurality of communication devices; and
   allocating a second subset of the resources of the millimeter wave frequency band to the second plurality of communication devices;
   wherein the first subset of the resources of the millimeter wave frequency band is mutually exclusive of the second subset of the resources of the millimeter wave frequency band.

5. The control device of claim 1 wherein the resource controller allocates the resources of the millimeter wave frequency band by generating the first control data and the second control data.

6. The control device of claim 1 wherein the resources of the millimeter wave frequency band include at least one of: a plurality of frequency channels; a plurality of time slots; and a plurality of spatial channels.

7. The control device of claim 1 wherein the resource controller receives first usage data from the first plurality of communication devices and second usage data from the second plurality of communication devices via the communication interface.

8. The control device of claim 7 wherein the resource controller allocates resources of the millimeter wave frequency band to the first plurality of communication devices and the second plurality of communication devices based on the first usage data and the second usage data.

9. The control device of claim 7 wherein the first usage data includes at least one of a quality of service requirement, a throughput requirement, and device pairing data.

10. The control device of claim 1 wherein the resource controller downloads device software for execution to at least one device of: the first plurality of communication devices, and the second plurality of communication devices.

11. A method for controlling access to a millimeter wave frequency band, the method comprising:
    communicating first control data via a communication interface with a first plurality of communication devices that utilize the millimeter wave frequency band in accordance with a first protocol;
    communicating second control data via the communication interface with a second plurality of communication devices that utilize the millimeter wave frequency band in accordance with a second protocol; and
    allocating, via a resource controller, resources of the millimeter wave frequency band to the first plurality of communication devices and the second plurality of communication devices based on the first control data and the second control data.

12. The method of claim 11 wherein the first protocol includes a wireless high definition communication standard; and the second protocol includes a next generation millimeter wave communication standard.

13. The method of claim 11 wherein the millimeter wave frequency band includes a V-band.

14. The method of claim 11 wherein allocating the resources of the millimeter wave frequency band includes:
    allocating a first subset of the resources of the millimeter wave frequency band to the first plurality of communication devices; and
    allocating a second subset of the resources of the millimeter wave frequency band to the second plurality of communication devices;
    wherein the first subset of the resources of the millimeter wave frequency band is mutually exclusive of the second subset of the resources of the millimeter wave frequency band.

15. The method of claim 11 further comprising:
    generating the first control data; and
    generating the second control data.

16. The method of claim 11 wherein the resources of the millimeter wave frequency band include at least one of: a plurality of frequency channels; a plurality of time slots; and a plurality of spatial channels.

17. The method of claim 11 further comprising;
receiving first usage data from the first plurality of communication devices via the communication interface; and
receiving second usage data from the second plurality of communication devices via the communication interface.

18. The method of claim 17 wherein allocating the resources of the millimeter wave frequency band includes allocating resources of the millimeter wave frequency band to the first plurality of communication devices and the second plurality of communication devices based on the first usage data and the second usage data.

19. The method of claim 17 wherein the first usage data includes at least one of a quality of service requirement, a throughput requirement, and device pairing data.

20. The method of claim 11 wherein the first control data includes device software for execution by at least one of the first plurality of communication devices.

* * * * *